United States Patent [19]

Shinmi et al.

[11] Patent Number: 5,175,171
[45] Date of Patent: Dec. 29, 1992

[54] METHOD AND APPARATUS FOR THE PREPARATION OF SILICONE ELASTOMER FOAMS

[75] Inventors: Hideo Shinmi; Manabu Suto, both of Chiba, Japan

[73] Assignee: Dow Corning Toray Silicone Co., Ltd., Tokyo, Japan

[21] Appl. No.: 920,348

[22] Filed: Jul. 24, 1992

[30] Foreign Application Priority Data

Jul. 30, 1991 [JP] Japan ............... 3-190010

[51] Int. Cl.⁵ .................................. C08J 9/12
[52] U.S. Cl. ............................... 521/79; 521/81; 521/82; 521/91; 521/110; 521/133; 521/154
[58] Field of Search .............. 521/91, 79, 81, 110, 521/82, 133, 154

[56] References Cited

U.S. PATENT DOCUMENTS

| | | | |
|---|---|---|---|
| 4,026,844 | 5/1977 | Kittle et al. | 521/154 |
| 4,367,293 | 1/1983 | Schmitzu | 521/91 |
| 4,368,279 | 1/1983 | Modic et al. | 521/122 |
| 4,418,157 | 11/1983 | Modic | 521/154 |
| 4,590,222 | 5/1986 | Bauman | 521/154 |

FOREIGN PATENT DOCUMENTS 35012 12/1989 Japan .
35016 12/1989 Japan .

*Primary Examiner*—Morton Foelak
*Attorney, Agent, or Firm*—Robert Spector

[57] ABSTRACT

In accordance with the present method for preparing an elastomeric silicone foam, an inert gas is injected under superatmospheric pressure during or after the merging of a silanol-containing organopolysiloxane that is liquid at room temperature an organohydrogenpolysiloxane that is liquid at room temperature, and hydrosilation catalyst, the merging step is followed by mechanical mixing in an enclosed chamber, at which time the mixture is ejected into the atmosphere. Completion of cure with simultaneous evolution of hydrogen occur under atmospheric pressure with the reactive ingredients and the inert gas all present in a homogeneously microdispersed/mixed state. The present method stabilizes the cells formed by the hydrogen and makes possible the development of a large quantity of cells of uniform size and uniform distribution, resulting in a high-expansion ratio foam.

4 Claims, 1 Drawing Sheet

METHOD AND APPARATUS FOR THE PREPARATION OF SILICONE ELASTOMER FOAMS

BACKGROUND OF THE INVENTION

1. Field of the Invention

The present invention relates to a method and apparatus for preparing silicone elastomer foam.

2. Background Information

The properties of silicone elastomer foams, for example, heat resistance, hydrophobicity, cold resistance, ageing resistance and electrical insulation properties, are known to be much better than those of foams made from other types of polymers such as polyolefins and polyurethanes. One method for preparing silicone elastomer foams involves the mixing of two liquid organopolysiloxanes containing functional groups that react to produce a cured elastomer and hydrogen gas. A foam is generated by the hydrogen produced during the curing reaction. Because the evolved hydrogen is very light and readily escapes, the cells formed by the hydrogen in this method are unstable, and, moreover, growth of the cells has a strong tendency to be irregular. This precludes preparation of high-expansion ratio foams with a uniform cell structure.

SUMMARY OF THE INVENTION

One objective of the present invention is to provide a method for preparing silicone elastomer foams that do not exhibit the irregular growth and unstable cell formation associated with using hydrogen as a blowing agent, and thereby provide a high-expansion-ratio silicone elastomer foam with a uniform cell structure. a second objective is to provide an apparatus for preparing this silicone elastomer foam in a very efficient manner.

DETAILED DESCRIPTION OF THE INVENTION

This invention provides a method for preparing a silicone elastomer foam by (1) forming a reaction mixture comprising (A) a silanol-containing organopolysiloxane that is liquid at room temperature, (B) an organohydrogenpolysiloxane that is liquid at room temperature, and (C) an amount of a hydrosilation reaction catalyst sufficient to promote simultaneous curing of the reaction mixture and hydrogen gas evolution, where said reaction mixture is prepared in an enclosed apparatus and (2) allowing said reaction mixture to foam and cure under atmospheric pressure. The features that characterize the present method are introduction into said mixture of an inert gas under superatmospheric pressure during or following merging of ingredients A, B, and C, followed by mechanical mixing and ejection of the resultant reaction mixture into the atmosphere.

The apparatus for preparing the present foams comprises storage containers for the silanol-containing organopolysiloxane (ingredient A), the organohydrogenpolysiloxane (ingredient B), and the hydrosilation reaction catalyst (ingredient C); a merging chamber for ingredients A, B, and C; a mixing chamber for these ingredients located downstream with respect to said merging chamber; and a discharge orifice that discharges the mixture of ingredients A, B, and C from said device into the atmosphere. The characterizing features of the present apparatus are (1) the presence of an injection orifice for an inert gas that is located in the merging chamber and (2) use of completely enclosed or sealed merging and mixing chambers.

Injection of an inert gas during or following the merging of ingredients A, B, and C following by mechanical mixing of these ingredients results in a homogeneous composition. In addition, the completion of curing and hydrogen evolution are both carried out in the presence of a homogeneously microdispersed inert gas. These conditions result in stabilization of the cells formed by the hydrogen evolved by the curing reaction between ingredients A and B, uniformity in cell size and cell distribution, and the generation of a high-expansion-ratio foam containing a large number of cells.

Because an inert gas injection orifice is located in the merging chamber for components A, B and C and ingredients A, B, C and the inert gas are rapidly mixed and dispersed to homogeneity, the silicone elastomer foam is prepared a highly efficient manner.

While the merging chamber of the present device is not intended to generate a positive or active mixing of A, B, and C, the merging chamber should not hinder the mixing step of the present method. It is the mixing chamber of the device that brings about a positive or active mixing through a mechanical means.

INGREDIENTS OF THE FOAMABLE COMPOSITION

Figure 1:
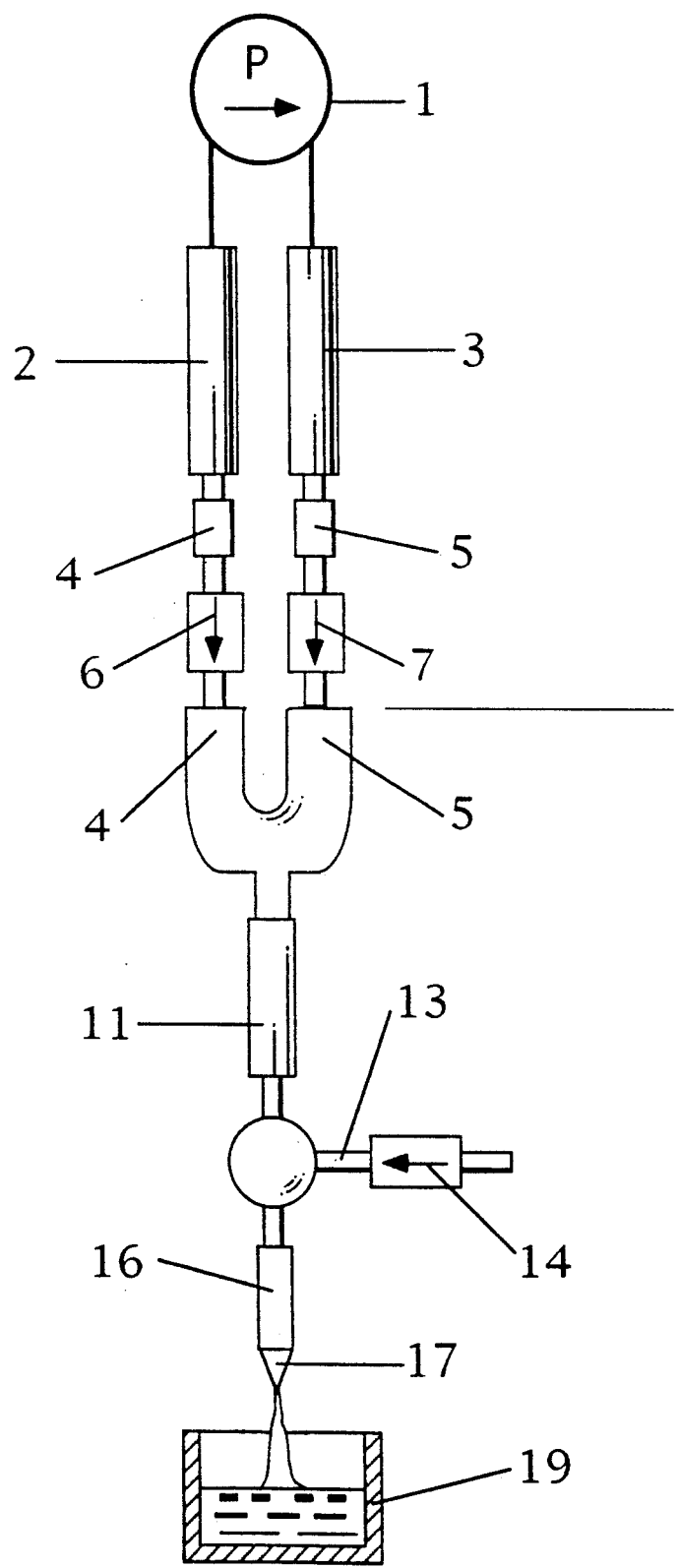
FIG. 1 is a diagrammatic view of an apparatus suitable for preparing foams in accordance with the present method.

Ingredient A of the present foamable composition is a silanol-containing organopolysiloxane, and is exemplified by but not limited to silanol-terminated dimethylpolysiloxanes and silanol-terminated dimethylsiloxane-methylphenylsiloxane copolymers.

Ingredient B is an organohydrogenpolysiloxane that functions as the crosslinker for ingredient A. Curing with the simultaneous evolution of gaseous hydrogen is brought about by the reaction of the silanol groups in ingredient A with the silicon-bonded hydrogen atoms in ingredient B. This reaction is promoted by the hydrosilation catalyst, ingredient C.

Examples of ingredient B include but are not limited to trimethylsiloxy-terminated methylhydrogenpolysiloxanes, trimethylsiloxy-terminated dimethylsiloxane-methylhydrogensiloxane copolymers, dimethylhydrogensiloxy-terminated dimethylsiloxane-methylhydrogensiloxane copolymers, cyclic dimethylsiloxane-methylhydrogensiloxane copolymers, and copolymers composed of $(CH_3)_3SiO_{\frac{1}{2}}$, $(CH_3)_2HSiO_{\frac{1}{2}}$, and $SiO_{4/2}$ units.

The viscosity of ingredient B should be within the range of 1 to 50,000 centipoise at 25° C. from a consideration of the miscibility with ingredient A.

The concentration of ingredient B should be equivalent to a molar ratio of from 1:1 to 10:1 for the silicon-bonded hydrogen atoms in ingredient B relative to the silanol groups in ingredient A.

The hydrosilation reaction catalyst, referred to as ingredient C, is not specifically restricted as long as it is capable of accelerating the condensation reaction between ingredients A and B. Ingredient C is exemplified by but not limited to platinum-containing catalysts such as chloroplatinic acid, chloroplatinic acid dissolved in an alcohol or ketone, and complexes between chloroplatinic acid and an olefin, alkenylsiloxane, or diketone; by organotin compounds such as dibutyltin diacetate, dibutyltin dilaurate, and tin dioctoate; and by aminoxy-containing organosilicon compounds such as polydimethyl(N,N-diethylaminoxy)siloxane.

A blend of ingredients C and A can be stored in a common container, but ingredient C must be stored separately from the organohydrogenpolysiloxane, ingredient B, due to the risk of hydrogen-evolving reactions.

The inert gas used by the present invention is exemplified by but not limited to air, nitrogen, helium, argon, and the like, with air being preferred.

FIG. 1 is a diagrammatic view of an embodiment of the present apparatus in which a previously prepared mixture of ingredients A and C is stored in a single container (2), however the present invention encompasses the storage of these ingredients in separate containers. Ingredients A, B, and C are supplied from containers 2 and 3 to merging chamber 11 via transfer lines 4 and 5. An injection orifice 13 is installed in this merging chamber 11 in order to inject an inert gas into the mixture of ingredients A, B, and C combined in the merging chamber 11.

In a preferred embodiment, the location of the inert gas injection orifice 13 is as near as possible to the entrance of the merging chamber 11 in order to inject the inert gas immediately after ingredients A, B, and C, supplied from transfer lines 4 and 5, respectively, have been combined.

The injection of inert gas serves to homogenize the mixture and disperse the hydrogen generated during curing, thereby promoting a regular cell growth. The reasons for this are not understood by the present inventors, however, they believe that the light, highly diffusible hydrogen produced by the reaction of ingredients A and B blends with the previously added inert gas that is present in a homogeneously dispersed state. This blending of the gases suppresses rapid cell growth and results in the presence of a large number of cells of uniform size and uniform distribution in the cured foam.

Following injection of the inert gas, ingredients A, B, and C are introduced without interruption into fully enclosed mixing chamber 16, wherein ingredients A, B, C and the inert gas are mixed to the maximum extent possible to yield a homogeneous microdispersion.

The mixing chamber contains mixing devices of the static or dynamic type, but these devices are not otherwise restricted. Use of a static mixing device is preferred because it yields a homogeneous, microfine mixture/dispersion of ingredients A, B, C and the inert gas.

The mixture of ingredients A, B, and C containing the finely dispersed inert gas is then discharged into the atmosphere from discharge element 17, which can be a nozzle, located at the terminus of the mixing chamber 16. This discharge can take the form of a batch discharge in bulk form or a continuous discharge in strand form.

The discharged material is directed into a form, such as a mold, or into the gaps or seams of a structure. At this time curing proceeds to completion through the reaction of ingredients A and B simultaneously with hydrogen generation, thereby producing a foam in any desired shape.

The present invention can provide silicone elastomer foams with expansion ratios of from 2 to 30, with expansion ratios of from 5 to 15 being preferred.

EXAMPLE

The following example describes preferred embodiments of the present method and apparatus and method, and should not be interpreted as limiting the scope of the invention described in the accompanying claims. Unless otherwise specified all parts and percentages are by weight and viscosity measurements were conducted at 25° C.

With reference to FIG. 1 of the accompanying drawing, container 2 was loaded with 100 parts of a silanol-terminated dimethylpolysiloxane containing 0.15 weight % of silicon-bonded hydroxyl groups and exhibiting a viscosity of 2,000 centipoise, 3 parts of carbon black, and 0.5 parts of a chloroplatinic acid/divinylsiloxane complex containing 5 ppm platinum. Storage container 3 was loaded with 10 parts of a trimethylsiloxy-terminated methylhydrogenpolysiloxane containing 1.5 weight percent of silicon-bonded hydrogen and exhibiting a viscosity of 1,000 centipoise. These ingredients were gradually and continuously supplied in equal quantities by extrusion pump 1 through transfer lines 4 and 5 to merging chamber 11 where they were combined. Following injection of air from injection orifice 13 located at the merging chamber 11, the resultant mixture was supplied to mixing chamber 16 composed of a 12-stage static mixer, where it was blended to homogeneity.

The final mixture was discharged into the atmosphere from a nozzle with a tip diameter of 5 mm (discharge orifice 17) and was directed into a mold 19, where the curing reaction began and proceeded to completion.

The product was a black silicone elastomer foam with continuous cells and an expansion ratio of 10. The density of the foam was 0.1 g/cm 3. The foam was soft with a low hardness (a value of 0 on the JIS A scale) and exhibited an excellent resistance to compression.

That which is claimed is:

1. In a method for preparing a silicone elastomer foam by (1) forming a reaction mixture comprising (A) a silanol-containing organopolysiloxane that is liquid at room temperature, (B) an organohydrogenpolysiloxane that is liquid at room temperature, and (C) an amount of a hydrosilation reaction catalyst sufficient to promote simultaneous curing and hydrogen gas evolution, where said reaction mixture is prepared in an enclosed apparatus and (2) allowing said mixture to foam and cure under atmospheric pressure, the improvement comprising introducing an inert gas into said mixture under superatmospheric pressure during or following merging of ingredients A, B, and C, followed by mechanical mixing and ejection of the resultant reaction mixture into the atmosphere.

2. A method according to claim 1 where the organic groups present on said organopolysiloxane and said organohydrogenpolysiloxane are monovalent hydrocarbon radicals, said hydrosilation catalyst is platinum metal or a platinum compound and said inert gas is nitrogen, helium, argon or air.

3. A method according to claim 2 where said hydrocarbon radicals are selected from the group consisting of methyl and phenyl and said inert gas is air.

4. An apparatus for preparing silicone elastomer foam comprising (1) storage containers for (A) a silanol-containing organopolysiloxane that is liquid at room temperature, (B) an organohydrogenpolysiloxane that is liquid at room temperature, and (C) a hydrosilation reaction catalyst; (2) a merging chamber for blending said ingredients A, B, and C; (3) a mixing chamber for said ingredients located downstream with respect to said merging chamber; and a discharge orifice for the resultant mixture; said apparatus being characterized by the presence in said merging chamber of an orifice for injection into said ingredients of an inert gas under superatmospheric pressure, where said merging and mixing chambers are fully enclosed.

* * * * *